Dec. 29, 1959  D. C. HULL ET AL  2,918,701
METHOD FOR PELLETING ORGANIC THERMOPLASTIC MATERIALS
Filed Feb. 23, 1956

David C. Hull
Robert J. Schrader
INVENTORS

ATTORNEYS

Dec. 29, 1959     D. C. HULL ET AL     2,918,701
METHOD FOR PELLETING ORGANIC THERMOPLASTIC MATERIALS
Filed Feb. 23, 1956     2 Sheets-Sheet 2

David C. Hull
Robert J. Schrader
INVENTORS

BY
ATTORNEYS

United States Patent Office 2,918,701
Patented Dec. 29, 1959

2,918,701

METHOD FOR PELLETING ORGANIC THERMOPLASTIC MATERIALS

David C. Hull and Robert J. Schrader, Longview, Tex., assignors to Eastman Kodak Company, Rochester, N.Y., a corporation of New Jersey Application February 23, 1956, Serial No. 567,199

7 Claims. (Cl. 18—47.5)

This invention relates to a method for forming pellets of organic thermoplastic material. More particularly, our invention relates to a method for forming uniform pellets of polyethylene which are of a desired shape.

In the production and use of thermoplastic compositions, it is important that the individual particles be of uniform size and density. In forming such compositions in injection molding and extrusion apparatus into manufactured products, it is necessary that they first be converted to a semi-molten, plastic condition. This is ordinarily accomplished by passing the particles through a heated zone by means of a device such as a screw or plunger which may be driven at a uniform rate. Under such conditions, the use of a thermoplastic composition of greatly varying particle size will result in the smaller particles or fines being heated more thoroughly than the oversize particles. In some cases, the finer particles may become completely molten or overheated, while the largest particles become softened only at their surfaces. As a result, the molded or extruded articles may vary considerably in strength, toughness and appearance; and operational control of the molding or extrusion equipment may be very difficult.

Heretofore, various methods have been employed in an attempt to obtain the desired particle uniformity in molding and extrusion compositions. These methods have met with varying success depending on the characteristics of the particular composition being employed, but none of these methods have been entirely satisfactory for polyethylene. Such methods include casting or extruding sheets, rods or ribbons with subsequent cooling and chipping or cutting into granules. These require complicated equipment, and involve extensive operational and maintenance difficulties, and when exmployed on polyethylene have produced granules of greatly varying size and bulk densities. When polyethylene is heated to a fluidity sufficient for extrusion without the use of excessive pressures, it is too fluid and tacky for cutting into pellets immediately upon exit from an extrusion die with the methods and equipment previously known. Attempts to cut such tacky plastics have resulted in smearing, adherence of the molten polyethylene particles to each other and to the cutting equipment.

An object of the present invention is therefore to provide a novel method for producing uniform pellets of an organic thermoplastic composition.

Another object of this invention is to provide a novel method for producing uniform pellets of polyethylene.

A further object is to provide a method which eliminates cooling and hardening polyethylene shapes prior to pelleting or granulating.

Yet another object of this invention is to reduce solid polyethylene in pellets of uniform size, shape, composition, and bulk density.

Another object is to produce polyethylene in the form of uniform sized spheroids.

Still another object is to provide a method for producing polyethylene pellets under the surface of an inert liquid where oxidation and contamination of the pellet is prevented.

Another object is to provide a method for preventing dissolved ethylene in the polyethylene pellets from disrupting the shape of the pellets.

Other objects will be apparent hereinafter.

In accordance with our invention, these and other objects are attained by employing the methods generally described in the following paragraphs, and which are further described subsequently, in detail, in connection with the related drawings.

The preferred apparatus for carrying out the process of the invention comprises a pellet-forming device including a conduit member having a torpedo centered in the conduit which directs the organic thermoplastic composition, for example, polyethylene in a narrow cylindrical flow to a die having a plurality of round die orifices positioned in a circular relationship in the face of the die; the diameter of the circle of orifices corresponds to the diameter of the moving cylinder of polyethylene. This first die, therefore, produces a plurality of rods of the plastic. After leaving the die openings, these plastic rods pass immediately into and through matching openings in a cutter plate which may be heated with steam or other means, which is mounted in line with the die orifices. The hot thermoplastic rods continuously emerge from the leading side of the cutter plate into a vertical chamber filled with water where, while immersed in the water, they are continuously cut off into short lengths or pellets by revolving knives positioned on a cutter head. The cutter head is rotated by a hollow shaft through which water is forced so as to sweep the newly cut pellets away from the cutter knives and cutter plate.

When the pellets are of a specific gravity less than water, such as polyethylene pellets, they will float to the top of the water-filled chamber. A horizontal column, also containing water, is in fluid connection with the top portion of the vertical water-filled chamber. A weir is positioned at the exit end of the horizontal column and permits a narrow stream of water to flow continuously over the weir and out of the horizontal column. This flowing stream also conducts the hot pellets out of the horizontal column and delivers them onto an endless mesh belt or vibrating screen. The water flows through the belt or screen to a pan positioned thereunder from which it is recycled or conducted to a sewer. The hot pellets drain off surplus water through the mesh belt or screen which, if desired, may be shaken or vibrated, and residual moisture is expelled by the latent heat remaining in the pellets. The temperature of the pellets at this point of the process can be regulated by adjusting the temperature of the water in the system and/or the temperature of the extrusion apparatus. Additional heat if desired can be supplied to the drying pellets on the mesh belt or screen from hot air jets, infrared lamps, steam coils, or resistance heaters suitably positioned adjacent the moving pellets. The dry pellets can be conducted by conventional equipment to inspection, sorting and packaging devices, if desired.

In addition to the features of employing the water to cool, heat, and convey the pellets out of the apparatus as well as to prevent their oxidation and contamination, the water may be employed for another important purpose as is now explained.

We have found that when polyethylene is brought from the reactor directly to this pelleting apparatus, it will contain unpolymerized ethylene gas distributed throughout the polymer. Unless the pellets are formed and also solidified in an atmosphere exerting a pressure greater than that of the ethylene gas contained in the pellet, this ethylene gas will flash and expand the pellets into an undesirable structure and in the extreme into a popcorn-like form. In a typical case, the polyethylene may be conveyed from a low-pressure separator at about 2 to 20 p.s.i.g. Without a water column above the point where the pellets are formed, that is, the cutter plate, which is high enough to at least give a water pressure in excess of the ethylene pressure, the pellets will immediately puff up due to the expansion force of the occluded ethylene gas. Moreover, the pellets must also be retained at this pressure long enough to permit solidification to a point where bubble formation will not occur. Since polyethylene pellets float, the water column must not only be high enough to exert the required pressure at the point of pelleting, but also to exert this pressure at some point above the pelleter which will have been reached by the upwardly floating pellets by the time solidification of the pellet is complete enough to prevent the formation of bubbles in the pellet. After this point, ethylene gas trapped in the interior of the pellet, will diffuse out without affecting the pellet shape or its density.

The present invention is further illustrated in the following detailed description and in the accompanying drawings in which.

Figure 1:
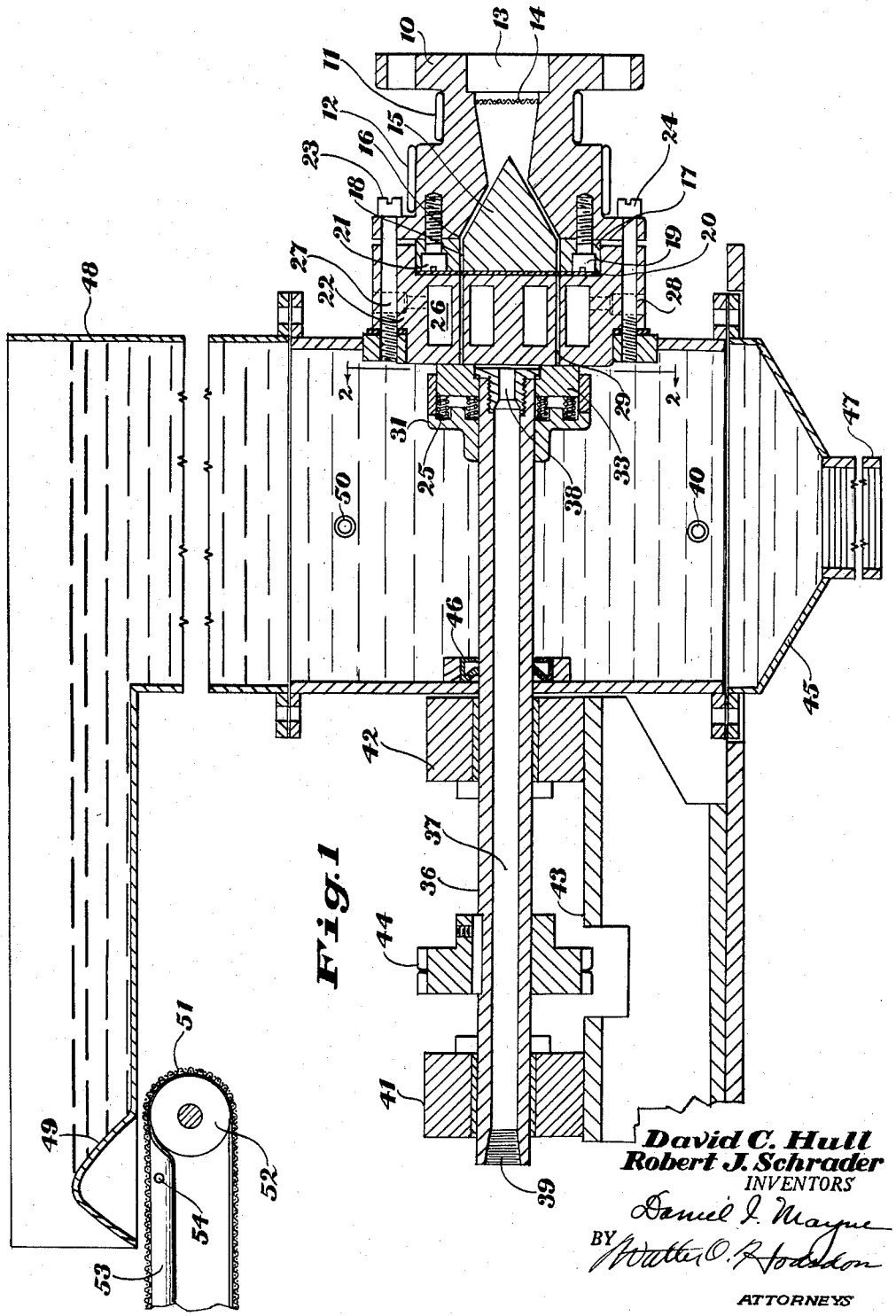
Fig. 1 is a view in cross-section of the apparatus for carrying out the process of our invention.
Figure 3:
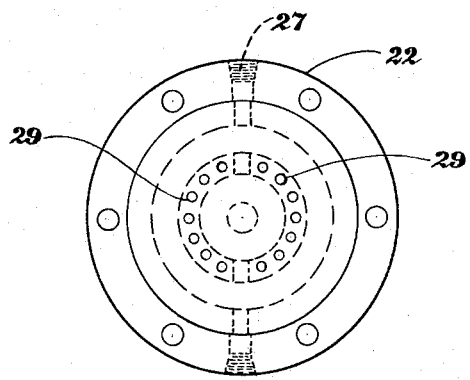
Fig. 3 is a front view of the cutter plate.

Referring to Fig. 1, the apparatus there shown in cross-section, comprises an extrusion die 10, heated by heaters 11 and 12, and having a throat 13 in which is positioned a screen 14 and a torpedo 15. The torpedo 15 is mounted centrally in throat 13 and with the adjacent wall of the die 10 forms a cylindrical passage 16 therebetween. A die plate 17 having a plurality of round orifices 18 positioned therein in a circular relationship is attached to die 10 by a plurality of bolts, two of which are shown at 19 and 21. The diameter of the circle which is defined by the die plate orifices 18 corresponds with the diameter of the cylindrical passage 16 and the orifices 18 are positioned to be in fluid communication with cylindrical passage 16. A cutter plate 22 is attached to die 10 by bolts, two of which are shown as 23 and 24, and insulated from die plate 17 by insulating member 20. The insulating member 20 may be an asbestos gasket which has apertures matching those of the die plate and cutter plate. When operating the cutter plate at a temperature different from that of the die, the insulating gasket 20 prevents transfer of heat from the cutter plate to the die. The cutter plate 22 has heating chambers 26 therein to which steam can be introduced through conduits 27 and from which condensate can leave through conduit 28. As shown more clearly in Fig. 3, the cutter plate 22 also has a plurality of orifices 29 extending therethrough and they are of the same number and diameter as those orifices 18 of die plate 17 and are axially positioned to be in communication with the matching orifices 18 of die plate 17. The heated cutter plate 22 also serves to prevent "freezing" of the extruded rods in the cutter plate and die when the apparatus is stopped. Otherwise, the cooler water in the adjacent chamber 45 would tend to congeal the plastic and starting up the extrusion would be difficult.

Figure 2:
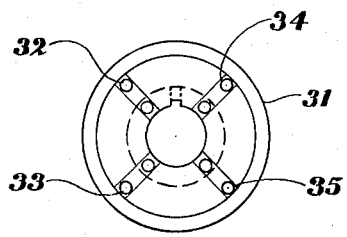
Fig. 2 is view of the cutter head taken on the lines 2—2 of Fig. 1.

A cutter head 31 having, as shown more clearly in Fig. 2, four spring-loaded cutter knives 32, 33, 34, 35, two of which are shown in Fig. 1, is mounted on hollow rotatable shaft 36. The knives are positioned to be pressed by springs 25 into contact with the leading face of the cutter plate 22 and when the knives are rotated they will pass over the orifices 29 in cutter plate 22. Shaft 36 has a hollow channel 37 therein which terminates in a nozzle 38. A water line can be suitably connected to the end of the shaft 36 at 39. The water, under suitable pressure, will flow out of the nozzle 38 and against the face of cutter plate 22. Shaft 36 is suitably supported by bearing members 41 and 42 which are mounted on support 43 and may be rotated by pulley 44 by motive means, not shown.

As is shown in Fig. 1, the leading face of the cutter plate 22 and the cutter head 31 with its spring-loaded knives are positioned in a water-tight vertically extending chamber 45. The drive shaft 36 extends through one wall of chamber 45 and packing 46 is positioned around the shaft to prevent water leakage. The lower end of chamber 45 terminates in a drain pipe 47, which may be closed by a valve, not shown, when the pelleting device is in operation. The drain pipe 47 serves as a clean-out for chamber 45. The upper part of chamber 45 is connected to a horizontally extending water-tight chamber 48, one end of which is open except for a weir 49. Beneath the weir 49 is positioned an endless mesh belt 51 which is rotatably supported by drums, one of which is shown at 52. A drip pan 53 having a drain 54 is positioned beneath the belt 51 to carry away water flowing over the weir. The belt may be vibrated, by conventional means, not shown, to assist in removing water from the pellets.

A conventional screw extruder or gear pump, not shown, is attached to the die 10 so that hot thermoplastic can be continuously forced through the pelleting apparatus.

The operation of the apparatus is now described in connection with the production of polyethylene pellets. Hot polyethylene is continuously forced into heated delivery throat 13 of die 10 by a conventional screw stuffer, not shown, but which is suitably attached to the die 10. Any solid particles are held back by screen 14, while the screened plastic polyethylene flows around torpedo 15 and is formed into a polyethylene cylinder having a relatively thin wall. The torpedo may be internally heated if desired, by conventional means, not shown, in order to maintain the polyethylene at this point at the proper degree of plasticity. The polyethylene now in the cylindrical form proceeds to the die plate 17 and is there forced through the round orifices 18 to form a plurality of semi-fluid polyethylene rods having a diameter desired for the pellets. These polyethylene rods proceed through the similar orifices of the cutter plate 22 and emerge from leading face of the cutter plate 22 into the water-filled chamber 45. The height of the water in chamber 45 is adjusted to exert sufficient pressure on the soft pellets as they are being hardened to prevent unpolymerized ethylene contained therein from changing the pellet shape. Generally, a water column high enough to exert 5 p.s.i.g. is sufficient for most operations. While immersed in water they are cut off into short uniform lengths or pellets by knives 32, 33, 34 and 35 which are rotated and pressed against the face of the cutter plate by the revolving cutter head 31. The cutter head 31 is rotated by the driven hollow shaft which carries a stream of water under pressure and which is forced through the nozzle in the cutter head. This stream of water aids in sweeping the newly cut pellets radially away from the cutter knives. The pellets, being semi-molten at the moment of cutting, tend to assume a spheroidal shape as soon as they are cut free into the water when the process is operating under preferred conditions. The polyethylene pellets have a specific gravity less than 1 and float to the top of the vertical water column and are swept along the horizontal water column 48 and over the weir 49 onto endless mesh belt or screen 51 where excess water is drained into pan 53 and to the sewer or to a recycle system through pipe 54. Although the skin of the pellets has been solidified and cooled by the water, the pellets may be still hot internally at this point and this residual heat may be sufficient to dry the pellets as well as expel residual ethylene therefrom. At this point the pellets have sufficient resistance to the occluded ethylene so that no change in shape occurs. If necessary, an air blast, or other device mentioned above, can be employed for assisting the drying. The endless belt or screen can be employed to conduct the pellets to subsequent processing or packaging operations, not shown.

The preferred extrusion temperature will vary with the type of plastic being extruded and, for polyethylene, will depend in part on the melt viscosity being produced. For polyethylene, temperatures in the range of 250°–500° F. may be maintained in the pelleting apparatus, with a temperature of about 350°–450° F. appearing best. In general, the temperature will be set within a range which will give suffifficient fluidity for uniform and rapid flow without the use of excessive power and which will also allow the pellets to assume the desired spheroidal shape before hardening. Higher temperatures are disadvantageous both in their deleterious effect on the plastic and in the tendency toward increased difficulty of cutting without smearing as the fluidity increases. Temperatures which are too low make the plastic difficult to extrude, may cause density variations, and may decrease the self-drying ability of the pellets.

The optimum water temperature will depend partly upon the extrusion temperature, the extrusion and water flow rates, and on the plastic being pelleted, and partly upon the amount of heat to be removed to obtain the desired pellet. The water must be cool enough to harden the pellet skin quickly so as to minimize sticking or jamming and yet it should not cool the pellet so rapidly that the pellet cannot assume the desired shape or retain sufficient internal heat to be self-drying.

The water flow or turbulence should be sufficient to sweep the pellets away from the cutters and to carry the finished pellets over the discharge weir. If desired, the flow through the cutter shaft can be supplemented by flows introduced near the bottom of the column 45 through pipe 40 or in the water column above the cutter through pipe 50. Water introduced at these various points may be of different temperatures. For example, the water in the cutting chamber may be maintained at a lower temperature for rapid initial cooling, while that in the horizontal column may be hotter to aid in drying. Water temperatures from 50° F. to 160° F. have been employed for polyethylene pellet production, with temperatures of 70° F. to 125° F. appearing best at the cutter, and with water temperatures of 175° F. to 210° F. being employed in the horizontal conveying stream.

Very low cutter speeds do not appear desirable. Higher speeds are advantageous in promoting a clean cut of the extruded rods, in flinging the cut pellets rapidly away from the blades, and in providing a pump impeller action which increases the water flow flushing the pellets away from the cutting zone, especially when the blades are set at an angle. At lower speeds the pellets may jam together in the cutting zone, and form large particles or even choke the cutter. Shaft speeds of 100 to 2,000 r.p.m. have been used successfully. The cutter speed can be varied with the rate of extrusion to obtain the desired pellet size. The motor rotating the cutter head shaft may be separately controlled from that operating the extruder. A window, not shown, may be provided in the wall of column 45 in order to inspect operation of the apparatus.

The following examples further illustrate our invention:

*Example 1*

Polyethylene having a melt index of 500 which is very sticky when fluid was made into pellets having the spheroidal shape shown in Fig. 1. 4 by employing the apparatus illustrated in Fig. 1. The extrusion temperature was 350–450° F. The temperature of the water in the vicinity of the cutting knives was maintained at 65° F., and the flow of water through the cutter shaft was adjusted to force the pellets away from the cutter plate. The knives were rotated at a shaft speed of 900 r.p.m. The temperature of the water in the horizontal column was maintained at 100° F. in order to prevent overcooling of the pellets thereby assuring that sufficient heat remains in the pellets to aid in drying them when they are removed from the water.

*Example 2*

Polyethylene having a melt index of 0.04 was made into spheroidal pellets in the apparatus shown in Fig. 1. The extrusion temperature was 450° F. The temperature of the water in the vicinity of the cutting knives was maintained at 60–140° F., and the flow of water through the cutter shaft was adjusted to force the pellets away from the cutter plate. Water heated to the above temperature was introduced through pipe 40 also to assist the pellets to move away from the cutting point. The cutting knives were rotated at a shaft speed of 570 r.p.m. The temperature of the water in the horizontal column was maintained at a higher temperature, at 150° F., to restrict cooling of the pellets.

This invention provides a means of pelleting which eliminates many of the various steps heretofore used and which produces uniform pellets lacking the fines and oversize pieces which often appear in the cutting of previously hardened thermoplastic materials. The general form of the pellet produced in accordance wtih our invention depends on operating conditions. The pellet is spheroidal, although an elongated cylindrical body with convex-shaped ends can be produced.

The present invention eliminates the complexities of former pelleting operations and enables pellets to be produced much more uniformly, continuously and economically. For polyethylene, the water column flotation lift principle eliminates the necessity of elaborate and expensive handling and conveying equipment. The underwater pelleting not only minimizes sticking and jamming of pellets, but also provides for the safe dispersion of the ethylene which is expelled from the pellets. Proper control of temperatures allows pellet drying without expensive drying equipment. The heated die or cutter plate permits the extrusion to be easily started under water. Jams of pellets adjacent the cutter face are easily cleared by backing off the cutter and allowing the jammed pellets to be swept out of the way by the water flow. Within limits, pellet size may be changed without the necessity of changing the size of the orifices in the die. This last is accomplished simply by varying the correlation between extrusion rate and cutter speed, so that more or less material is contained in the cut pellet.

The above-described apparatus could be modified somewhat, for example, the die orifices in the die plate instead of continuing horizontally as shown, to form a single circle of openings on the exit side of the die plate, may diverge alternately toward and away from the center so as to form two or more concentric circles of more widely spaced openings on exit side of the die plates. Matching openings would in such a case be provided in the cutter plate so that the several plastic rods thus formed would be presented to the cutter knives. Alternately, the die and cutter plates could be made in one piece, so that the leaving face of this unit would function as a cutter plate, the entire unit being heated by conventional means.

As shown in the drawings, square-edged knives are employed to cut the extruded plastic rods into pellets, and they serve satisfactorily, particularly when the extrusion temperatures are lowered and the plastic is not too soft. The choice of knife designs and cutter head types which will operate satisfactorily is large. Advantageously, the cutter shaft is so mounted that the cutter head may be retracted from the cutting plate even while the device is in operation to facilitate the clearing of pellet jams and the adjustment or replacement of the cutting means. The knives may be set with the cutting edges passing through the axis of rotation, or may have the cutting edges disposed at an angle so as to provide both a slicing and shearing action. The angle between the cutter plate and blade face may be varied, if desired.

While as described in connection with Fig. 1, a flat face extrusion die is employed, we may alternately employ a cylindrical die which has a plurality of the extrusion orifices in the cylindrical walls of the die. A plurality of knives may be moved in an orbital path over the cylindrical die to cut the extruded polyethylene into pellets. Temperature and extrusion conditions will parallel those employed when a flat faced die is operated. In this case, however, water flow from the bottom of the vertical water chamber is a means for forcing the pellets away from the cutting position.

Our apparatus, therefore, provides means for forming polyethylene pellets while immersed in water which is utilized to cool, convey and discharge the newly formed pellets from the apparatus. There is provided an essentially closed system which protects the pellets from oxidation and contamination and greatly minimizes the danger from any ethylene which may be evolved from the material when pelleted.

While particularly adapted for forming pellets from polyethylene and polyethylene compositions, other thermoplastic compositions may be formed into pellets by our invention. These include such thermoplastics as vinyl chloride, methyl methacrylate, styrene, cellulosics, etc.

When forming pellets of thermoplastic compositions having a density greater than water, an endless conveyor belt can be installed at the bottom of water-filled column 45 to carry the pellets upwardly through water and out of the pelleting apparatus. Such a conveyor belt would follow the general path taken by the water flow in the pelleting apparatus shown in Fig. 1.

Alternately, the conveyor belt could be installed to remove the heavier than water pellets from the bottom of the water-filled column 45. In this case, the endless belt would follow a horizontal path through a horizontal water column and then go upwardly through a vertical water column in which the water was maintained at a sufficient level to permit water to fill water column 45 at a level above the extrusion die, as will be understood.

Figure 4:
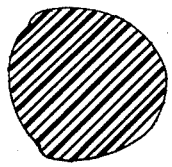
Fig. 4 is a cross-sectional view of a typical polyethylene pellet produced in accordance with our invention.

The novel shape of the pellets as shown by the representation in Fig. 4 is advantageous since they easily flow downwardly in the hoppers of injection molding and extrusion machines without bridging.

The uses and advantages of the underwater polyethylene pellets as stated before, are to convert bulk molding compounds into small, uniform pellets containing no fines or dust. Pellets such as these have a high bulk density, feed uniformly, and are ideal for use in molding and extrusion machines. The advantages of pelleting under water are a simplified operation, prevention of oxidation of the hot plastic which if oxidized would have a lower dielectric strength, highly efficient cooling of the pellets after they are cut, a minimum of contamination, and a very uniform product. Our novel apparatus and method of operation therefore produces from polyethylene highly pure, non-oxidized polyethylene pellets.

We claim:

1. The method of forming pellets from a molten poly-α-olefin thermoplastic composition containing a gas under a disruptive pressure which comprises extruding said composition containing said gas directly into a column of inert liquid having a specific gravity greater than said composition and a hydrostatic pressure at and above the point of extrusion greater than the pressure of said gas and a temperature less than the temperature of said extruded composition, cutting the extruded composition at the point of extrusion while immersed in said liquid into pellets, cooling said pellets by contact with said liquid, permitting the pellets to rise in said column of liquid, maintaining said hydrostatic pressure on said pellets during said rise until the pellets cool to a non-deformable state, conducting the pellets out of said liquid to a point of drying and drying the pellets.

2. The method of forming pellets from molten polyethylene composition containing therein free ethylene gas under a disruptive pressure which comprises extruding the composition containing said gas directly into a column of inert liquid having a specific gravity greater than said composition and a hydrostatic pressure at and above the point of extrusion greater than the pressure of said gas and a temperature less than the temperature of said extruded composition, cutting the extruded composition at the point of extrusion while immersed in said liquid into pellets, cooling said pellets by contact with said liquid, permitting the pellets to rise in said column of liquid maintaining said hydrostatic pressure on said pellets during said rise until the pellets cool to a non-deformable state, conducting the pellets out of said liquid to a point of drying, and drying the pellets.

3. The method of forming pellets from molten polyethylene composition containing therein free ethylene gas under a disruptive pressure which comprises extruding the composition containing said gas directly into a column of water the specific gravity of which is greater than said composition and the hydrostatic pressure of which at and above the point of extrusion is greater than the pressure of said gas and the temperature of which is less than the temperature of said extruded composition, cutting the extruded composition at the point of extrusion while immersed in the water into pellets, cooling said pellets by contact with said water, permitting the pellets to rise in said column of water, maintaining said hydrostatic pressure on said pellets during said rise until the pellets cool to a non-deformable state, conducting the pellets out of the water to a point of drying, and drying said pellets.

4. The method of forming pellets from molten polyethylene composition containing therein free ethylene gas under a disruptive pressure which comprises extruding the composition containing said gas in the form of rods directly into a column of water the hydrostatic pressure of which at and above the point of extrusion is greater than the pressure of said gas and the temperature of which is less than the temperature of said extruded rods, cutting the ends off the extruded rods at the point of extrusion to form pellets, cooling said pellets by contact with said water, permitting the pellets to rise in said column of water maintaining said hydrostatic pressure on said pellets during said rise until the pellets cool to a non-deformable state, conducting the pellets out of the water to a point of drying, and drying said pellets.

5. The method of forming pellets from molten polyethylene composition containing therein free ethylene gas under a disruptive pressure which comprises extruding the composition containing said gas at a temperature within the range of 350 to 450° F. in the form of rods directly into a column of water, the specific gravity of which is greater than said composition and the hydrostatic pressure of which at and above the point of extrusion is greater than the pressure of said gas and the temperature of which is within the range of 70 to 125° F., cutting the ends off the extruded rods at the point of extrusion to form pellets, cooling said pellets by contact with said water, permitting the pellets to rise in said column of water, maintaining said hydrostatic pressure on said pellets during said rise until the pellets cool to a non-deformable state, heating said non-deformable pellets by permitting them to pass through water having a temperature within the range of 100 to 210° F., conducting the pellets out of the water to a point of drying and drying said pellets.

6. The method of forming pellets from molten polyethylene composition containing therein free ethylene gas under a disruptive pressure which comprises extruding the composition containing said gas at a temperature of approximately 450° F. in the form of rods directly into a column of water the specific gravity of which is greater than said composition and the hydrostatic pressure of which at and above the point of extrusion is greater than the pressure of said gas and the temperature of which is approximately 65° F., cutting the ends off the extruded rods at the point of extrusion to form pellets, cooling said pellets by contact with said water, permitting the pellets to rise in said column of water, maintaining said hydrostatic pressure on said pellets during said rise until the pellets cool to a non-deformable state, heating said non-deformable pellets by permitting them to pass through water having a temperature of approximately 100° F., conducting the pellets out of the water to a point of drying, and drying said pellets with the residual heat in said pellets.

7. The method of forming pellets from a molten poly-α-olefin thermoplastic composition containing an α-olefin gas under a disruptive pressure which comprises extruding said composition containing said gas directly into a column of inert liquid having a specific gravity greater than said composition and a hydrostatic pressure at and above the point of extrusion greater than the pressure of said gas and a temperature less than the temperature of said extruded composition, cutting the extruded composition at the point of extrusion while immersed in said liquid into pellets, cooling said pellets by contact with said liquid, permitting the pellets to rise in said column of liquid, maintaining said hydrostatic pressure on said pellets during said rise until the pellets cool to a non-deformable state, conducting the pellets out of said liquid to a point of drying and drying the pellets.

References Cited in the file of this patent

UNITED STATES PATENTS

| | | |
|---|---|---|
| 1,987,358 | Bonnot | Jan. 8, 1935 |
| 2,021,837 | Davidson | Nov. 19, 1935 |
| 2,273,188 | Graves | Feb. 17, 1942 |
| 2,384,224 | Williams | Sept. 4, 1945 |
| 2,436,201 | Cole | Feb. 17, 1948 |
| 2,570,423 | Batchelder et al. | Oct. 9, 1951 |
| 2,614,290 | Street | Oct. 21, 1952 |
| 2,732,592 | Tunnicliff et al. | Jan. 31, 1956 |

FOREIGN PATENTS

| | | |
|---|---|---|
| 638,992 | Great Britain | July 21, 1950 |
| 531,561 | Belgium | September 1954 |

UNITED STATES PATENT OFFICE
CERTIFICATE OF CORRECTION

Patent No. 2,918,701                      December 29, 1959

David C. Hull et al.

It is hereby certified that error appears in the printed specification of the above numbered patent requiring correction and that the said Letters Patent should read as corrected below.

Column 1, line 47, for "exmployed" read -- employed --; line 65, for "reduce" read -- produce --; column 5, line 13, for "suffifficient" read -- sufficient --.

Signed and sealed this 19th day of July 1960.

(SEAL)
Attest:

KARL H. AXLINE                      ROBERT C. WATSON
Attesting Officer                  Commissioner of Patents